United States Patent
Fellows

[19]

[11] Patent Number: 6,071,634
[45] Date of Patent: Jun. 6, 2000

[54] ELECTRIC POWER GENERATION SYSTEM INCLUDING FUEL CELLS

[75] Inventor: Richard Griffith Fellows, Loughborough, United Kingdom

[73] Assignee: BG PLC, Reading, United Kingdom

[21] Appl. No.: 09/101,355

[22] PCT Filed: Nov. 3, 1997

[86] PCT No.: PCT/GB97/03023

§ 371 Date: Sep. 2, 1998

§ 102(e) Date: Sep. 2, 1998

[87] PCT Pub. No.: WO98/21770

PCT Pub. Date: May 22, 1998

[30] Foreign Application Priority Data

Nov. 8, 1996 [GB] United Kingdom ............... 9623327

[51] Int. Cl.[7] .................. H01M 8/04; H01M 8/18; H01M 2/00
[52] U.S. Cl. .................. 429/14; 429/17; 429/19; 429/20; 429/34
[58] Field of Search .................. 429/14, 17, 19, 429/20, 34

[56] References Cited

U.S. PATENT DOCUMENTS

| | | |
|---|---|---|
| 4,490,442 | 12/1984 | Maru et al. |
| 4,983,471 | 1/1991 | Reichner et al. |
| 5,047,299 | 9/1991 | Shockling . |
| 5,143,800 | 9/1992 | George et al. |

FOREIGN PATENT DOCUMENTS

| | | |
|---|---|---|
| 0 266 861 A1 | 5/1988 | European Pat. Off. . |
| WO 91/11034 | 7/1991 | WIPO . |

OTHER PUBLICATIONS

The effect of fuel cell operating conditions on DIR–MCFC system selection. J. of Power Sources 61, pp. 213–218, 1996.

Primary Examiner—Maria Nuzzolillo
Assistant Examiner—Tracy Dove
Attorney, Agent, or Firm—Larson & Taylor

[57] ABSTRACT

A electrochemical power generation system comprising a plurality of fuel cells electrically connected to each other, each fuel cell having an anode and a cathode. A plurality of first passage means are associated with and defined by the anodes and a plurality of second passages means are associated with and defined by the cathodes. The first passage means is divided into a first group and a second group of passage means. A third passage means is connected to the inlets of the first group to supply fuel gas to the first group. A fourth passage means receives the anode exhaust gas from the first group. The fourth passage means is divided into first and second streams, the first stream is supplied to the third passage means and the second stream is supplied to inlets to the second group of the first passage means as fuel. Solid oxide fuel cells or molten carbonate fuel cells are used.

12 Claims, 2 Drawing Sheets

ELECTRIC POWER GENERATION SYSTEM INCLUDING FUEL CELLS

This invention relates to an electric power generation system comprising a plurality of fuel cells electrically connected one to another, for example as a stack of fuel cells.

According to the invention an electric power generation system comprises a plurality of fuel cells electrically connected one to another, said fuel cells comprising anodes and cathodes, a plurality of first passage means associated with and defined at least in part by said anodes, a plurality of second passage means associated with and defined at least in part by said cathodes, said first passage means being divided into at least a first group of said first passage means and a second group of said first passage means, third passage means connected to inlets to the first passage means in the first group for said third passage means to supply fuel gas to the first group, fourth passage means to receive anode exhaust gas from said first group of first passage means and supply that anode exhaust gas in first and second streams in which said first stream is supplied to the third passage means for supply with said fuel gas to the first group of the first passage means and the second stream being supplied to inlets to the second group of the first passage means as fuel.

The invention will now be further described, by way of example, with reference to the accompanying drawings in which.

Figure 1:
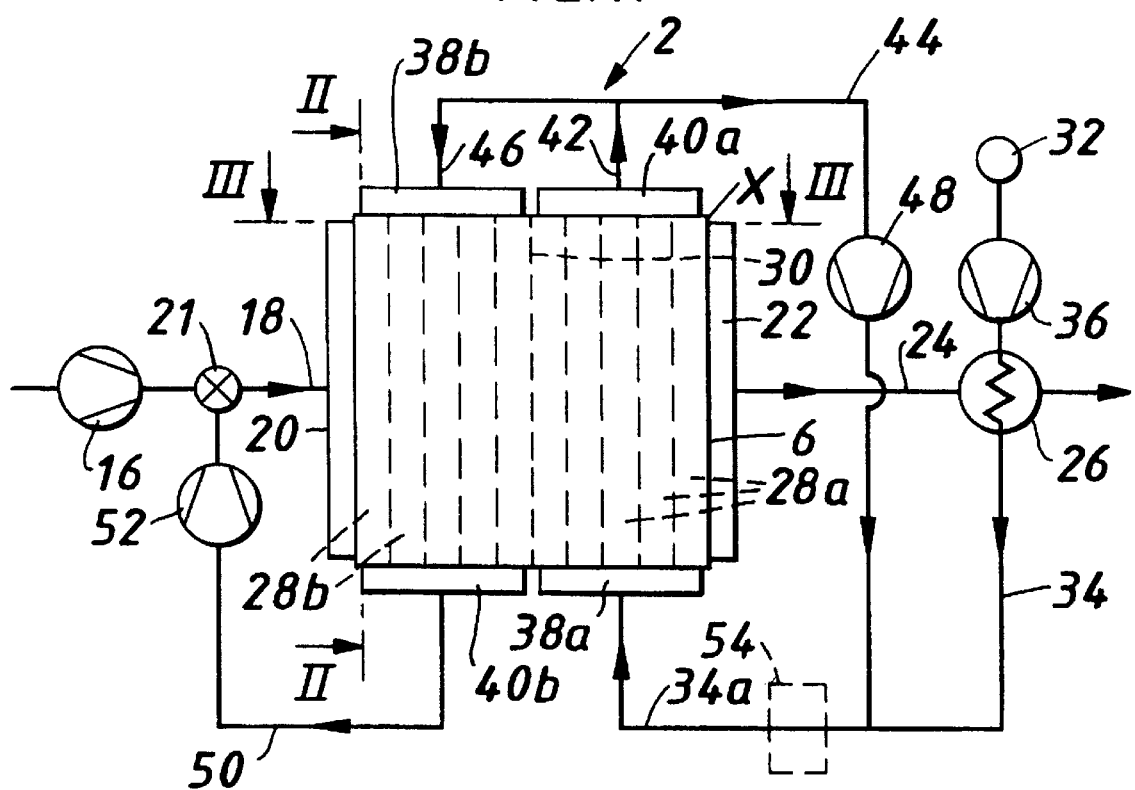
FIG. 1 is diagrammatic illustration of a plan view of an embodiment of an electric power generation system according to the invention.

In the drawings like references refer to like or comparable parts.

Figure 2:
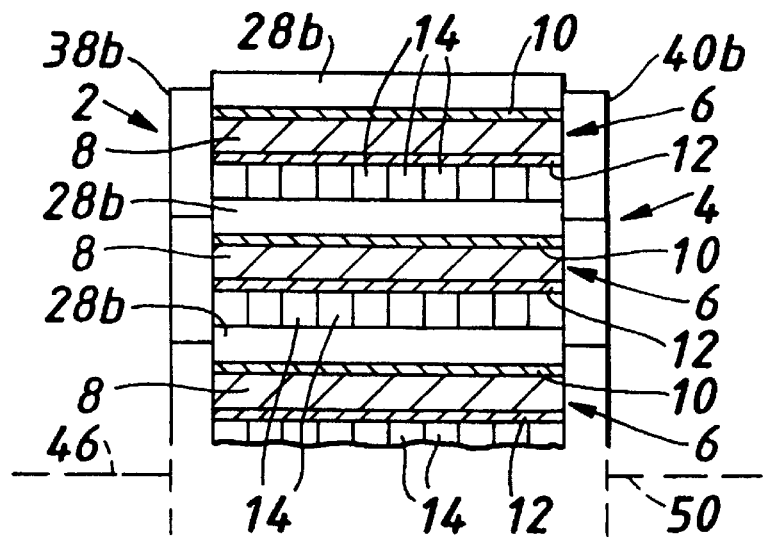
FIG. 2 is a diagrammatic illustration of the fuel cell stack on line II—II in FIG. 1.
Figure 3:
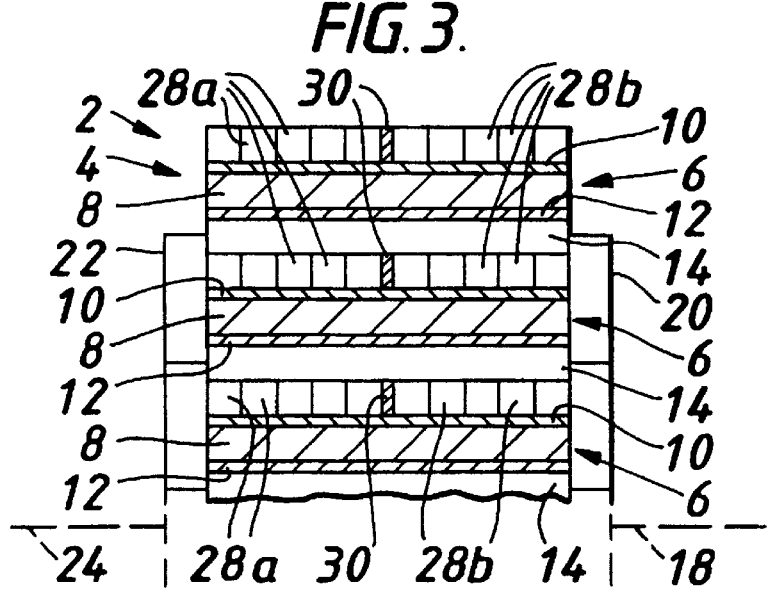
FIG. 3 is a diagrammatic illustration of the fuel cell stack on line III—III in FIG. 1.

With reference to FIGS. 1, 2 and 3 an electric power generation system 2 comprises a plurality or stack 4 of cross-flow fuel cells 6 electrically connected one to another in known manner for their electromotive forces to be additive. Each fuel cell comprises an electrolyte 8, an anode 10, and a cathode 12. Associated with the cathodes 12 are passages 14, hereincalled cathode passages.

Oxidising gas, for example air from atmosphere, is supplied by a pump or blower 16 to a supply path 18 feeding an inlet manifold 20 supplying the oxidising gas to the cathode passages 14. The supply path 18 comprises a gas heating arrangement 21 comprising burner means to burn a gaseous fuel supplied thereto to heat the oxidising gas which in the case of air provides some oxygen to support combustion of the gaseous fuel which heats the remaining oxygen supplied to the cathode passages 14.

Cathode exhaust gas leaves the cathode passages 14 through a cathode exhaust manifold 22 feeding an outlet path 24 comprising an heat exchanger 26 in which heat is extracted from the cathode exhaust gas and added to fuel gas as described below.

Associated with the anodes 10 are passages (hereincalled anode passages) which, related to each fuel cell 6, are divided into two groups; the anode passages in one group are identified as anode passages 28a and those in the other group are identified as anode passages 28b, said groups being divided the one from the other for the purpose of illustration in this specification by an imaginary partition 30.

Although the fuel required at the anodes 10 is hydrogen, it should be understood that the expression fuel gas used herein embraces both hydrogen and gaseous raw material from which hydrogen fuel is derived, for example any hydrocarbon, in the course of operating the system.

The fuel cells 6 may be of the solid oxide type having a solid oxide electrolyte 8 or may be of a molten carbonate type having a molten carbonate electrolyte.

The stack 4 of fuel cells is maintained at desired temperature and pressure appropriate to the electrolyte 8 and the nature of the fuel gas, initially supplied from a fuel gas supply 32 to a supply path 34 feeding an inlet manifold 38a supplying fuel gas to the anode passages 28a. At the upstream end, the supply path 34 comprises a pump or blower 36 and the heat exchanger 26 which adds heat to the fuel gas supplied through the path 34.

Anode exhaust gas leaves the anode passages 28a through an exhaust manifold 40a feeding outlet path 42 which divides the anode exhaust gas flow into paths 44 and 46. The exhaust gas path 44 comprises a pump or blower 48 feeding the exhaust gas in the path 44 to a downstream portion 34a of the supply path 34. Thus a first portion of anode exhaust gas from the anode passages 28a is mixed with fresh fuel gas in the path 34 and the mixture supplied to the inlet manifold 38a. The path 46 feeds into an inlet manifold 38b a second portion of the anode exhaust gas from the anode passages 28a, and the inlet manifold 38b feeds that anode exhaust gas as fuel into the anode passages 28b in which it flows in an opposite direction or counter-current to the gas flow in the anode passage 28a. The anode exhaust gas from the anode passages 28b leaves through an exhaust manifold 40b which feeds this anode exhaust gas to a supply path 50 comprising a pump or blower 52 feeding the anode exhaust gas in the path 50 as the gaseous fuel to the burner means in the heating arrangement 21.

The fuel gas from the supply 32 is at least one hydrocarbon capable of being reformed into molecular hydrogen for use as fuel by the fuel cells 6, for example the fuel gas may be natural gas which may be substantially methane. Preferably the reforming reaction takes place in the anode passages 28a, 28b provided with suitable reforming catalyst means known per se. With a view to ensuring that the anode exhaust gas leaving the anode passages 28a contains a desired amount of unconsumed hydrogen, the mass flow rate of gas through the passages can be relatively quick. If desired the anode passages 28a may be constructed to present less flow resistance than the anode passages 28b, for example the passages 28a may be of larger cross-section. Thus the mass flow rate of gas along the anode passages 28a is greater than along the anode passages 28b. One effect of this is that the amount of unconsumed hydrogen in the anode exhaust gas from the anode passages 28a is greater than that normally found in the anode exhaust gas from the anode passages of fuel cells operated conventionally. This hydrogen richer anode exhaust gas is re-circulated by the path 42, 44 and added to the fresh fuel gas and thus increases the amount of hydrogen ultimately available as fuel in the anode passages 28a. As a result Nernst voltages increase and fuel cell electrical resistance decreases. The electrical current output thus increases and this is achieved, without an overheating of the stack 4, in part because the greater gas flow in the passages 28a gives an increased cooling effect. Another effect is a better temperature distribution across the stack 4. By "better" is meant that the temperature difference between maximum and minimum temperatures in the stack 4 is less than in conventional systems which experience a temperature dip at the inlet ends of the anode passages due to the endothermic nature of the reforming reaction which takes place to a greater extent at the inlet ends than further along the anode passages. Enriching the fuel gas about to be supplied to the anode passages 28a reduces the hydrocarbon concentration in the mixture relative to that in the fuel gas alone. The reduction in hydrocarbon concentration may be great. Reduction in hydrocarbon concentration lowers the reforming reaction rate at the inlet ends of the anode passages 28a and thus the amount of heat extracted there by the endothermic reaction, and so the aforesaid temperature dip may be eliminated or at least reduced. Also a further improvement in temperature distribution across the stack may be achieved by grading the reforming catalyst means along the anode passages 28a and 28b to produce a more uniform rate of reforming reaction along the anode passages. For example, the amount or effective amount of the reforming catalyst means may increase per unit length from the inlet end to outlet end of each anode passage, the increase may be progressive or in increments.

If desired the reforming reaction may only take place in the anode passages 28a.

The gas flow rate through the anode passages 28a, 28b may also be varied by varying the speeds of the blowers 36 and 48.

If desired the reforming reaction may be carried out wholly or partially upstream of the anode passages 28a, for example in reforming means 54, which may be sensible heat reforming means, provided in the path portion 34a downstream of the junction between the paths 44 and 34.

Figure 4:
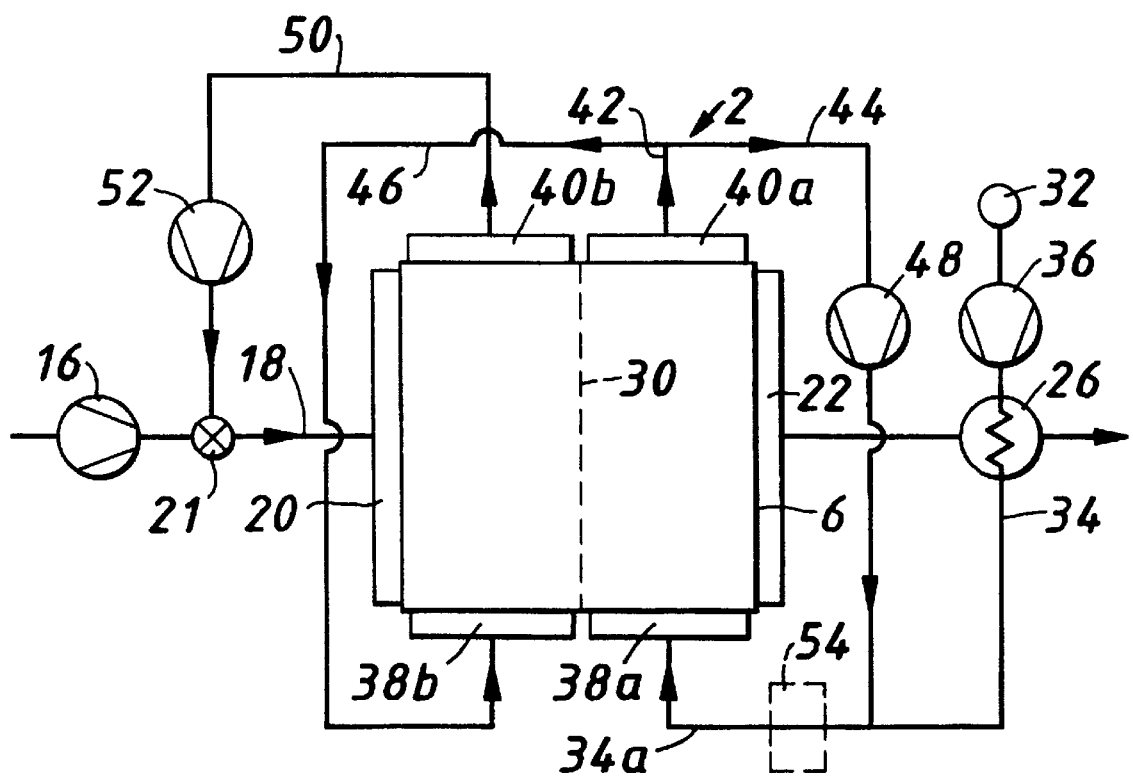
FIG. 4 is a diagrammatic illustration of another embodiment of an electric power generation system according to the invention.

In the embodiment in FIG. 4, the gas flows through the two groups of anode passages between the inlet manifolds 38a, 38b and the outlet manifolds 40a, 40b are in the same direction or co-current.

In a conventional cross-flow fuel cell stack there is a tendency to form a hot spot at the corner region that is furthest from both the inlets for fuel gas and oxidising gas. If the stack 4 in FIG. 1 were a known fuel cell stack that hot spot region would occur at the corner indicated by X.

In the systems in FIGS. 1 to 4 upstream portions of the cathode passages 14 are in close thermal contact with the anode passages 28b, and downstream portions of the cathode passages 14 are in close thermal contact with the anode passages 28a.

Development of a hot spot at corner region X in the system in FIG. 1 or FIG. 4 is reduced or prevented by the cooling effect of (i) the greater mass flow rate of gas through the anode passages 28a, and/or (ii) the endothermic reforming reaction which can be encouraged to take place in downstream portions of the anode passages 28a, and optionally in upstream portions of the anode passages 28b, by the effect of grading the reforming catalyst means along the anode passages. Thus a favourable stack efficiency and temperature distribution may be achieved.

If desired, the blower 52 may be omitted from any embodiment described above.

If desired, the blower 48 may be located in the path 34a or the path 42.

In the embodiments described above planar stacks of fuel cells are used, but the invention may also be applied to systems in which the stacks of fuel cells are of a tubular type.

What is claimed is:

1. An electric power generation system comprising a plurality of fuel cells electrically connected one to another, said fuel cells comprising anodes and cathodes, a plurality of first passage means associated with and defined at least in part by said anodes, a plurality of second passages means associated with and defined at least in part by said cathodes, said first passage means being divided into at least a first group of said first passage means and a second group of said first passage means, third passage means connected to inlets to the first passage means in the first group for said third passage means to supply fuel gas to the first group, fourth passage means to receive anode exhaust gas from said first group of first passage means and supply that anode exhaust gas in first and second streams in which said first stream is supplied to the third passage means for supply with said fuel gas to the first group of the first passage means and the second stream being supplied to inlets to the second group of the first passage means as fuel.

2. A system as claimed in claim 1, in which aforesaid fuel cells are disposed as a cross-flow stack.

3. A system as claimed in claim 1, in which each said fuel cell is a solid oxide fuel cell or a molten carbonate fuel cell.

4. A system as claimed in claim 1, in which oxidising fuel gas is supplied to said second passage means after being heated by an heating arrangement in which heat is provided as a consequence of burning anode exhaust gas from said second group of the first passage means.

5. A system as claimed in claim 1, in which the fuel gas comprises at least one hydrocarbon gas capable of being converted to molecular hydrogen by a reforming reaction.

6. A system as claimed in claim 5, in which the reforming reaction is arranged to take place in the first passage means comprising a plurality of passages containing reforming reaction catalyst means in an amount which is graded or varied along one or more of said passages.

7. A system as claimed in claim 6, in which the amount of reforming catalyst means increases per unit length along a said passage from an inlet for fuel gas thereto to an outlet end for gas exit therefrom.

8. A system as claimed in claim 5, in which reforming means is provided whereby the or at least part of the reforming reaction takes place outside the first passage means.

9. A system as claimed in claim 5, in which said hydrocarbon gas is methane.

10. A system as claimed in claim 5, in which said fuel gas is natural gas.

11. A system as claimed in claim 1, in which gas flow through the first group of the first passage means is in an opposite direction to or in counter-current to the gas flow through said second group of the first passage means.

12. A system as claimed in claim 1, in which gas flow through the first group of the first passage means is in the same direction to or in co-current with the gas flow through said second group of the first passage means.

* * * * *